United States Patent [19]
Nishida

[11] Patent Number: 5,752,103
[45] Date of Patent: May 12, 1998

[54] ELECTRONIC FLASH DEVICE

[75] Inventor: Takao Nishida, Urawa, Japan

[73] Assignee: Olympus Optical Co., Ltd., Tokyo, Japan

[21] Appl. No.: 790,327

[22] Filed: Jan. 28, 1997

[30] Foreign Application Priority Data

Feb. 2, 1996 [JP] Japan .................. 8-017856

[51] Int. Cl.$^6$ .................. G03B 9/70
[52] U.S. Cl. .................. 396/173
[58] Field of Search .................. 396/109, 159, 396/160, 161, 156, 173

[56] References Cited

U.S. PATENT DOCUMENTS

| | | | |
|---|---|---|---|
| 4,400,087 | 8/1983 | Nakayama | 396/173 |
| 4,592,639 | 6/1986 | Nakamura | 396/159 |
| 4,626,093 | 12/1986 | Matsui et al. | 396/109 |
| 4,951,081 | 8/1990 | Hosomizu et al. | 396/164 |
| 4,985,725 | 1/1991 | Serikawa | 396/159 |
| 5,115,169 | 5/1992 | Aoki | 396/161 |
| 5,313,247 | 5/1994 | Hosomizu et al. | 396/156 |
| 5,491,533 | 2/1996 | Sakamoto | 396/173 |

*Primary Examiner*—Russell E. Adams
*Attorney, Agent, or Firm*—Kenyon & Kenyon

[57] ABSTRACT

An electronic flash device for use with a camera having a shutter with an aperture that opens gradually. The electronic flash device includes a flash tube having a discharge path; a switching element arranged in the discharge path; and a light emission controller for controlling a light emission of the flash tube during an opening operation of the shutter by repeatedly turning on and off the switching element in accordance with the opening operation of the shutter. Thus, the electronic flash device can reliably maintain an expected photographic effect even in an unstable area of the shutter aperture.

22 Claims, 8 Drawing Sheets

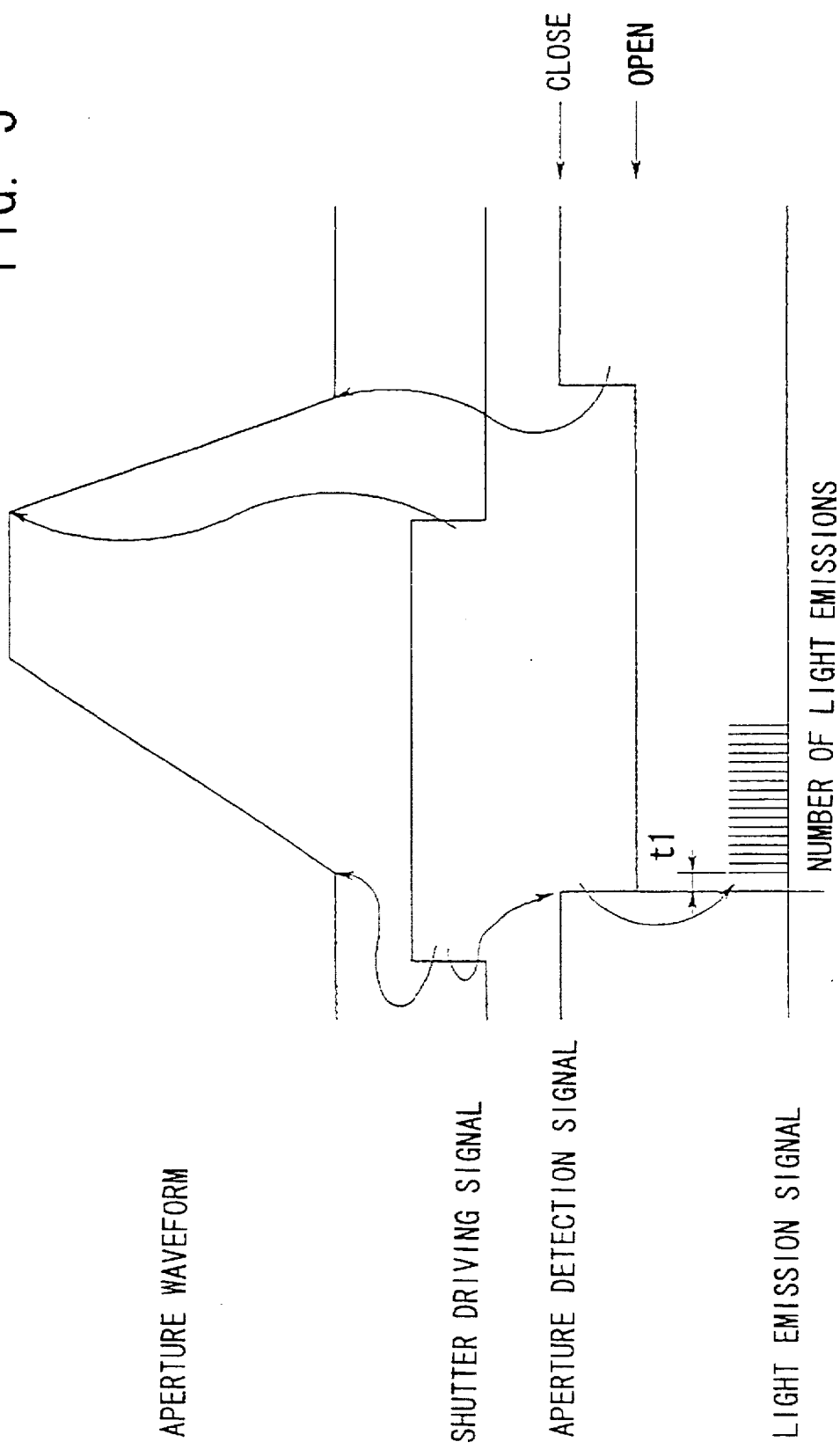

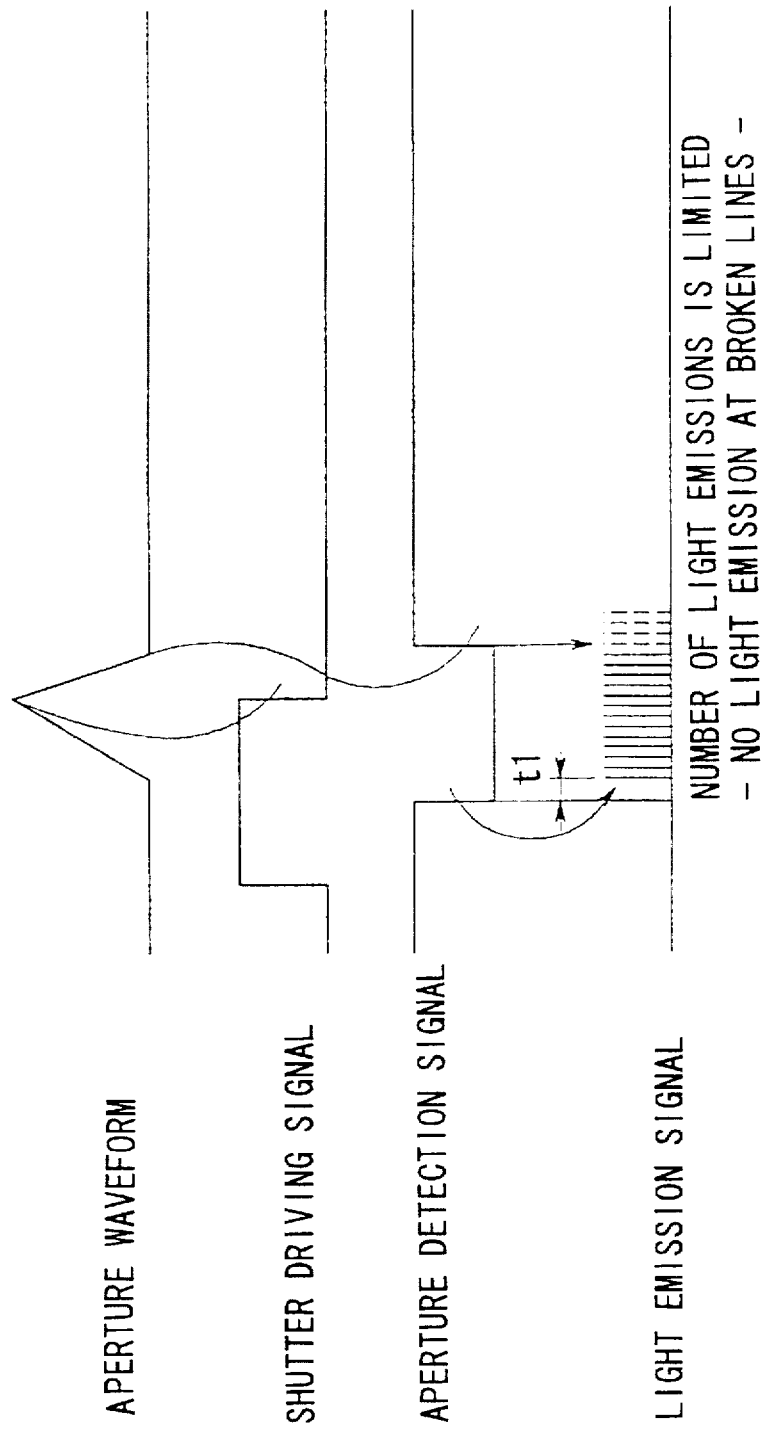

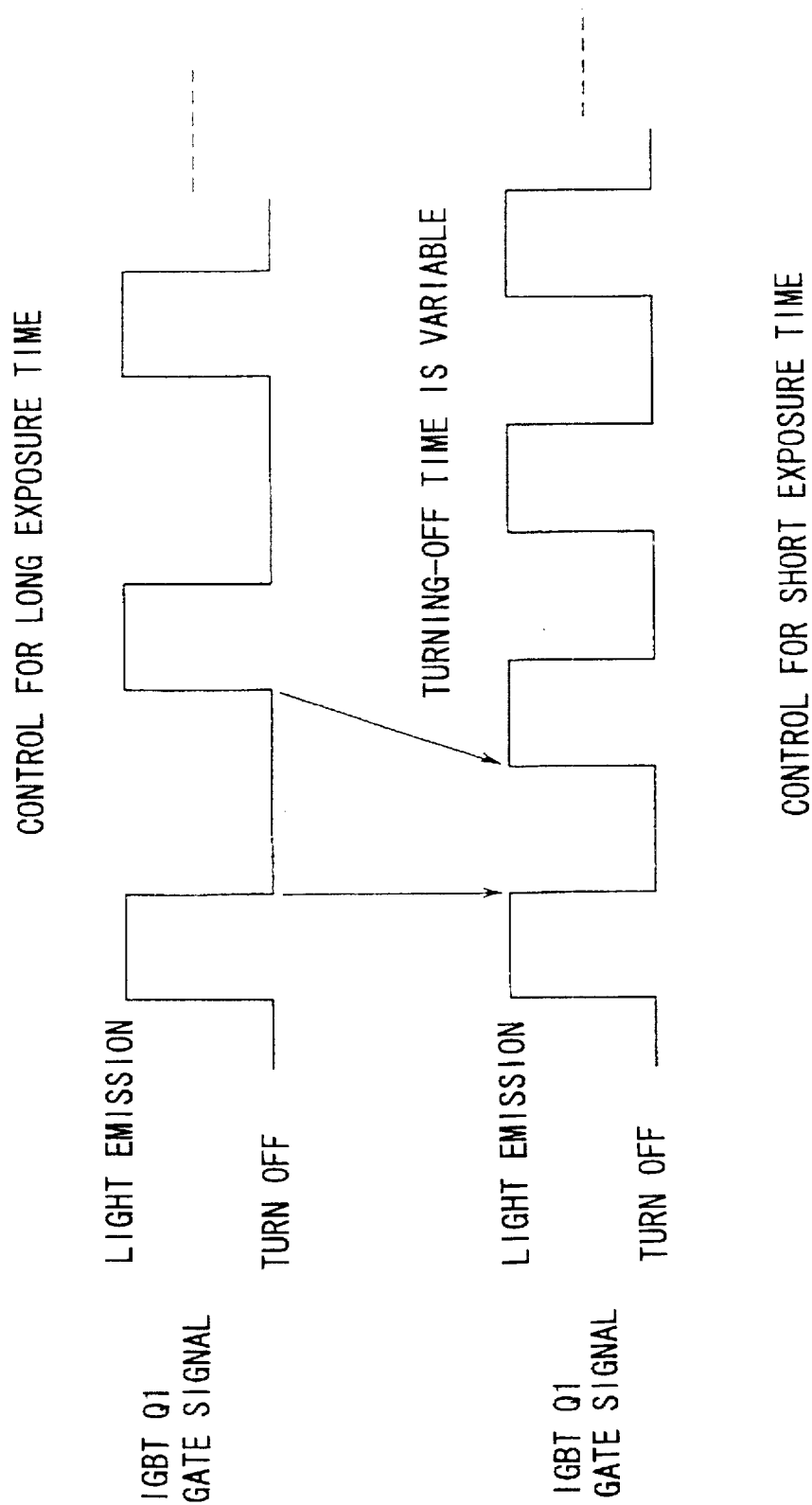

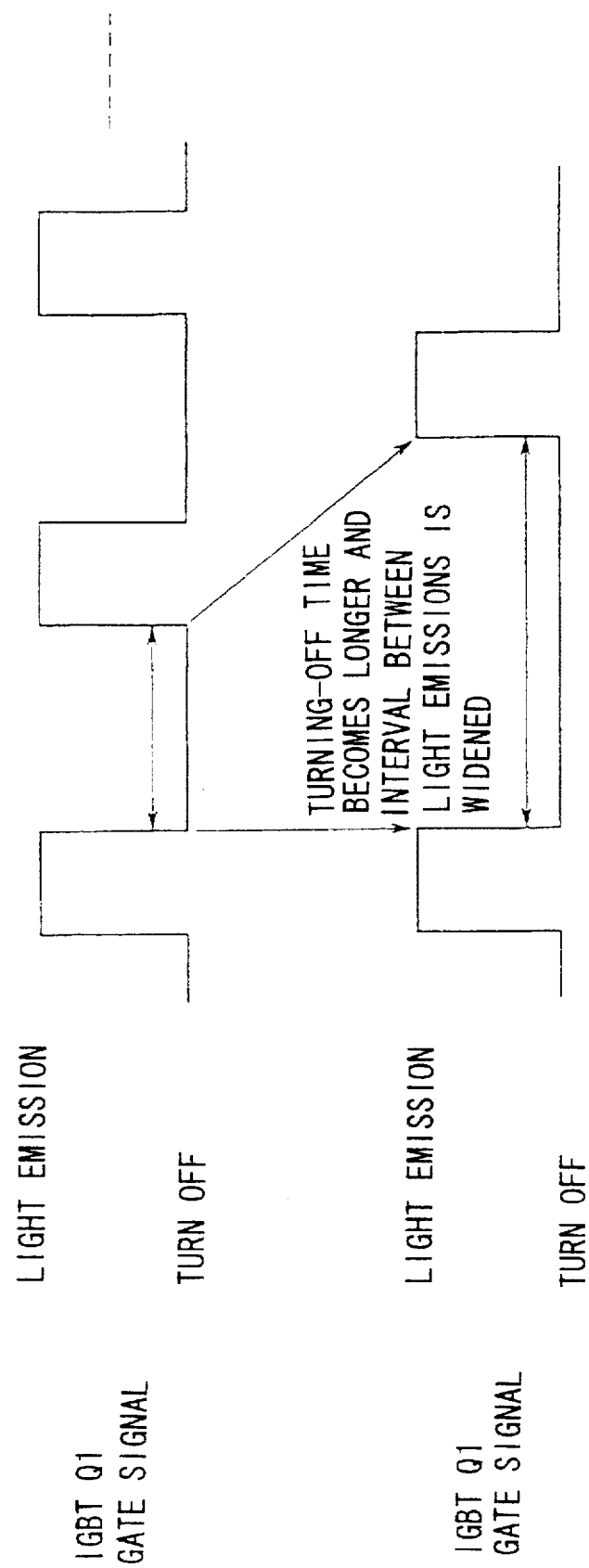

ELECTRONIC FLASH DEVICE

BACKGROUND OF THE INVENTION

1. Field of the Invention

This invention relates to an electronic flash device and more particularly to an electronic flash device which is used with a camera having a shutter whose aperture opens gradually.

2. Description of the Related Art

Conventionally, a flashmatic control (an FM control) and a guide number control elements are known as flash emitting control in a lens shutter camera using a shutter whose aperture opens gradually. In the flashmatic control, the flash device emits its full amount of light when the aperture value of the shutter corresponds to the object distance. In the guide number control, the flash device emits at a predetermined aperture value an amount of light corresponding to the object distance.

However, the conventional flash control method in the camera using such a shutter aperture has the following problems: For example, when photographing at a high intensity of ambient light, the size of the aperture is likely to become unstable because the aperture is small. Particularly, when photographing at a low temperature, the actual aperture value may not correspond to the regular aperture value calculated by the flashmatic calculation for emitting light; that is, the light may be emitted when the aperture is not at a correct value. Especially in the case of a camera which does not operate quickly due to its divergence from the standards, the light may be emitted when the aperture is not open. Thus, it is likely that the expected photographic effect by means of flash light cannot be obtained.

In view of the above problems, an object of this invention is to provide an electronic flash device which reliably maintains the expected photographic effect even in an unstable area of the shutter aperture.

SUMMARY OF THE INVENTION

In one aspect of this invention, an electronic flash device is used with a camera having a shutter with an aperture which opens gradually. The electronic flash device comprises a flash tube having a discharge path; a switching element arranged in the discharge path; and a light emission controller for controlling light emission of the flash tube during an opening operation of the shutter by repeatedly turning on and off the switching element in accordance with the opening operation of the shutter.

In another aspect of the present invention, an electronic flash control system is used with a camera having a shutter with an aperture which opens gradually, a shutter driving member for driving the shutter, and a light measuring circuit for determining an exposure time. The electronic flash control system includes a boosting circuit having a power source. The electronic flash control system includes a main capacitor that is charged with a high voltage by the boosting circuit. A flash tube is connected in series with the main capacitor in order to emit flash light. A trigger circuit applies a trigger voltage to the flash tube to emit the flash light. A semiconductor switch is connected in series with the flash tube in order to control the light emission of the flash tube. A central processing unit controls the activation and the deactivation of the semiconductor switch, the boosting circuit, and the trigger circuit. An exposure controller controls the shutter driving member in accordance with the exposure time determined by the light measuring circuit. The trigger circuit applies the trigger voltage to the flash tube when a predetermined time passes after the exposure controller starts driving the shutter driving member. The semiconductor switch is controlled to become conductive and nonconductive so as to repeatedly emit the flash light during the exposure time in accordance with a predetermined set of amounts and timings of the light emission.

In a further aspect of this invention, a camera comprises a shutter which opens gradually, and a flash device for emitting an illuminating light to an object to be photographed. The flash device repeatedly emits a small amount of the illuminating light during an opening operation of the shutter.

BRIEF DESCRIPTION OF THE DRAWINGS

FIG. 5 is a timing chart of a light emission control operation and an exposure control operation occurring at a low intensity of light in the electronic flash device of the first embodiment.

FIG. 6 is a timing chart of a light emission control operation and an exposure control operation occurring at a high intensity of light in the electronic flash device of the first embodiment.

FIG. 7 is a timing chart for explaining a light emission control operation in an electronic flash device of a second embodiment of this invention.

FIG. 8 is a time chart for explaining a light emission control operation in an electronic flash device of a third embodiment of this invention.

DETAILED DESCRIPTION OF THE PREFERRED EMBODIMENTS

Figure 1:
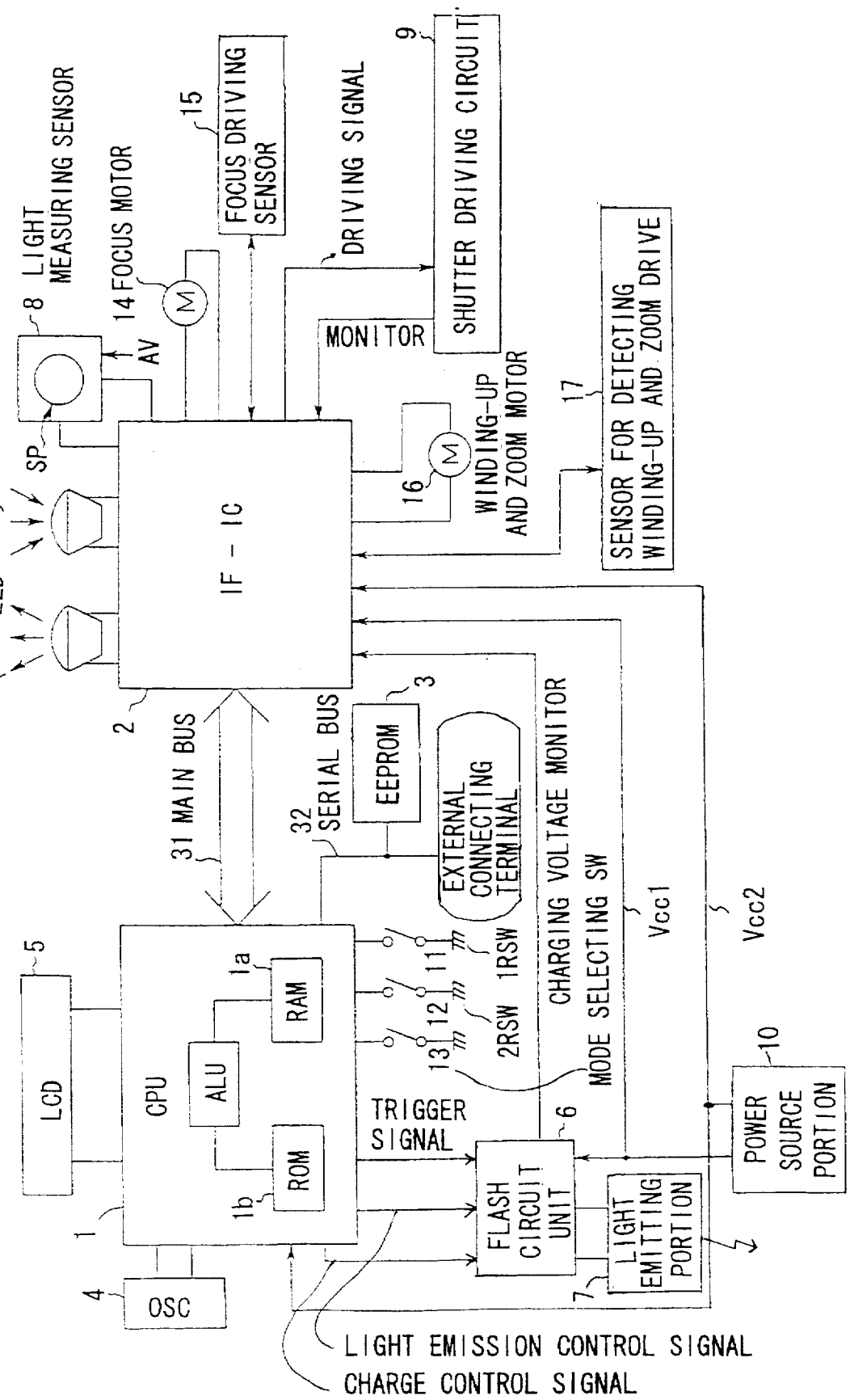
FIG. 1 is an electric circuit block diagram showing the structure of a camera to which an electronic flash device of a first embodiment of this invention is applied.

FIG. 1 is an electric circuit block diagram showing the structure of a camera to which an electronic flash device of a first embodiment of this invention is applied.

The camera is provided with a main central processing nit (CPU) 1 which executes sequential control of the various elements of the whole camera. The CPU 1 is connected via a main bus 31 to an interface integrated circuit (interface IC) 2, which is connected to a distance measuring unit and a light measuring sensor 8 for measuring object distance and object brightness, respectively, in accordance with instructions from the CPU 1. The data relating to the object distance and the object brightness are converted to digital data, which are transmitted to the CPU 1 via the main bus 31. The interface IC 2 is further connected to motors (such as a focus motor 14 and a winding-up and zoom motor 16) and sensors (such as a focus driving sensor 15 and a sensor 17 for detecting winding-up and zoom drive) These sensors detect the operation of camera mechanisms (not shown) that are driven by the motors. Pulse trains and "H" level and "L" level digital signals associated with the operation of the respective mechanisms are transmitted to the CPU 1.

A shutter driving circuit 9 for controlling the driving of the shutter is connected to the interface IC 2. The interface IC 2 outputs a driving signal including power to the shutter driving circuit 9. The shutter driving circuit 9 outputs to the interface IC 2 a monitor signal (a shutter aperture detection signal) for checking the opening of the shutter. In this embodiment, the shutter aperture detection signal is generated immediately before or after the shutter opening. However, the shutter aperture detection signal may be generated when the shutter is at a different aperture value.

The CPU 1 is connected to a liquid crystal display 5, and to an oscillator 4 for generating a high-speed oscillation clock. Through a serial bus 32 which is separate from the main bus 31, the CPU 1 is also connected to an electrically erasable/programmable read only memory (EEPROM) 3 for storing adjustment data of the manufacturing process of the camera, and fixed data necessary for driving various mechanisms and for performing exposure calculations. The serial bus 32 is also connected to an external connecting terminal, for communicating between the CPU 1 and an external jig or the like. Instead of the EEPROM 3, any other electrically rewritable nonvolatile memories, such as, for example, a flash memory, may be used.

Switches 11 to 13 are connected to the CPU 1. A first release switch 11 is turned on when a release button is pushed halfway, and a second release switch 12 is turned on when a release button is pushed completely. A switch 13 is a switch for selecting modes.

A power source portion 10 is employed as a power source for the various circuit elements of the camera outputs large-current power (Vcc1) for the flash system, the motor drive system and the shutter drive system. Power source portion 10 also outputs small-current power (Vcc2) for powering the CPU 1, the light measuring circuit and a distance measuring circuit 8, the interface IC 2, a flash circuit unit 6, and the EEPROM 3.

The flash circuit unit 6 is connected to the CPU 1, and it controls the emitting of flash from the light emitting portion 7. Namely, the flash circuit unit 6 receives from the CPU 1 these signals a charge control signal for charging the light emitting portion 7, a trigger signal for initiating the light emission of the light emitting portion 7, and a light emission control signal for turning off an insulated gate bipolar transistor (described below) to stop the light emission of the light emitting portion 7. The flash circuit unit 6 controls the light emitting portion 7 in response to these signals.

A charging voltage monitor signal is sent from the flash circuit unit 6 to the interface IC 2. The interface IC 2 converts the charging voltage monitor signal to a digital signal and transmits it to the CPU 1.

Figure 2:
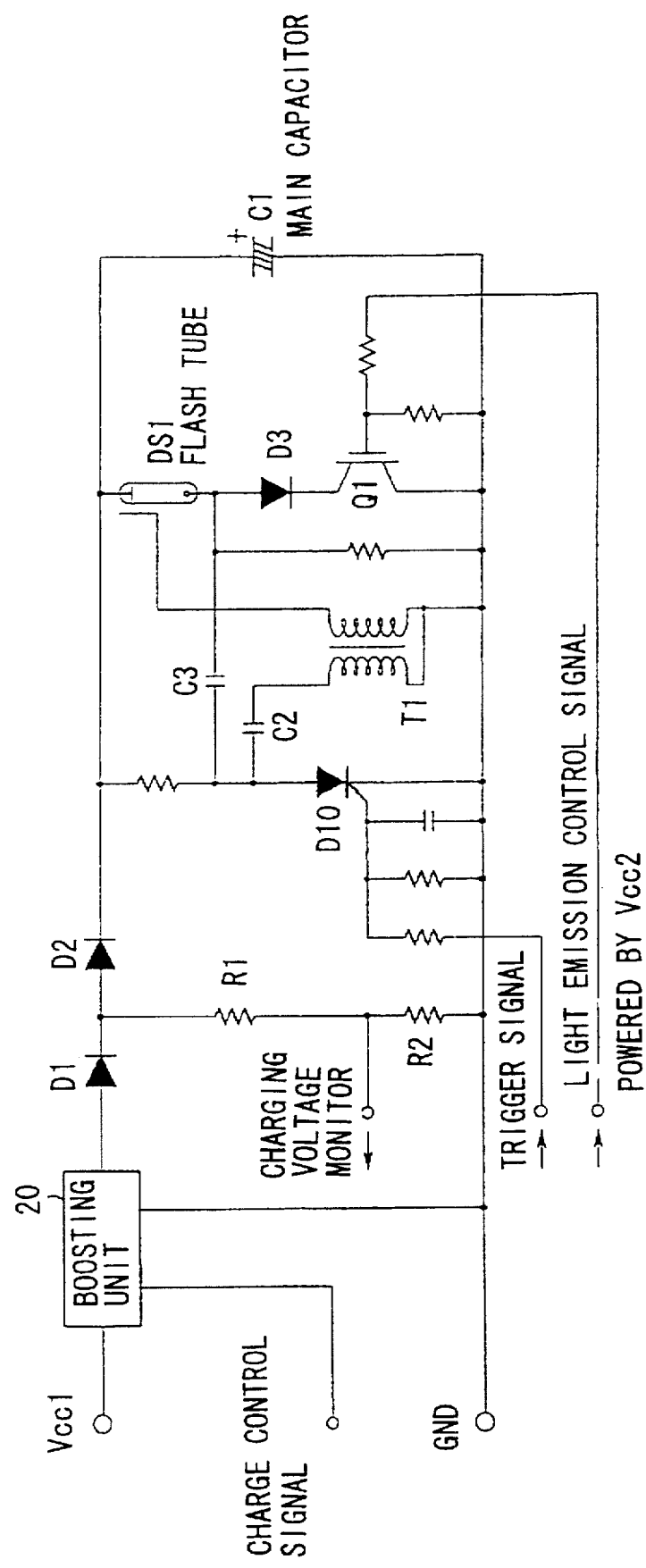
FIG. 2 is an electric circuit diagram showing the structure of a flash circuit unit in the electronic flash device of the first embodiment.

Next, referring to FIG. 2, the flash circuit unit 6 is described in detail.

As shown in FIG. 2, the large-current power Vcc1 is connected to a boosting unit 20, and the boosting unit 20 is activated by the charge control signal outputted from the 1. A high voltage from the boosting unit 20 is transmitted via diodes D1 and D2 to cause electric charges to be stored in main capacitor C1. Between a junction of the diodes D1 and D2 and ground GND, voltage dividing resistors R1 and R2 are connected. A voltage output divided by the voltage dividing resistors R1 and R2 is outputted to the interface IC 2 as a charging voltage monitor signal.

A series circuit comprising a flash tube DS1, a diode D3, and an insulated gate bipolar transistor (IGBT) Q1 is connected across and in parallel with the main capacitor C1. The IGBT Q1 is a semiconductor switching element which can be conductive and nonconductive in response to the light emission control signal from the CPU 1. That is, a light emission control signal line from the CPU 1 is connected to a gate of the IGBT Q1. In accordance with the light emission control signal, the emission and non-emission of the flash tube DS1 can be controlled.

A trigger terminal of the flash tube DS1 is connected to a light emission trigger line from a secondary winding terminal of a trigger transformer Ti. Further, an anode terminal of a thyrister D10 is connected to a primary winding terminal of the trigger transformer Ti via a capacitor C2. The thyristor D10 becomes conductive in response to the trigger signal from the CPU 1. Due to the conduction of the thyristor D10, the trigger transformer T1 is driven by the electric charges stored in the capacitor C2, and consequently, the trigger transformer T1 triggers the flash tube DS1.

In this embodiment, the CPU 1 directly controls the gate driving voltage of the IGBT Q1. Thus, the gate driving voltage of the IGBT Q1 is corresponds to voltage Vcc2 generated in the power source portion 10. However, a similar effect can be achieved even if the gate driving voltage of the IGBT Q1 is otherwise generated.

Figure 3:
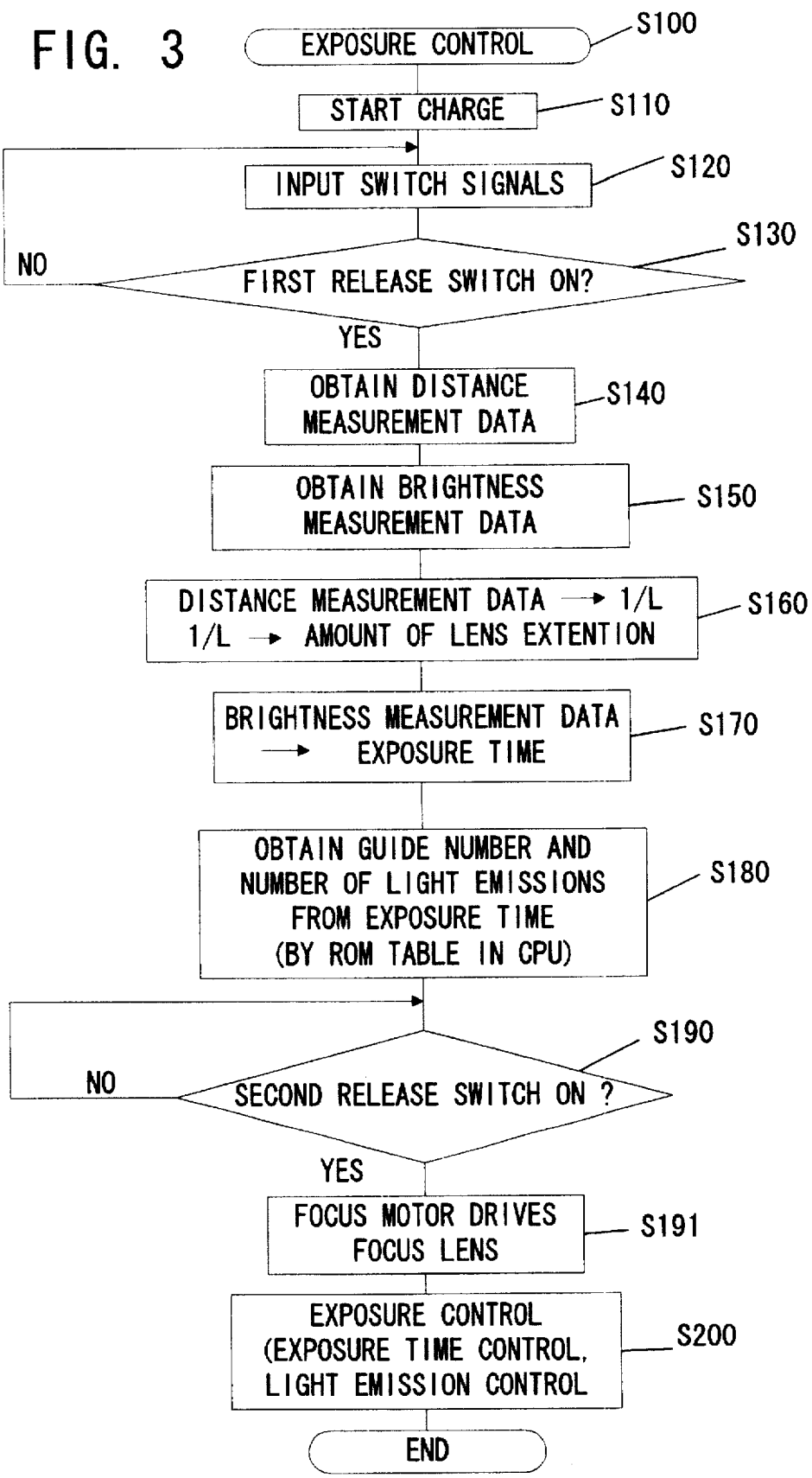
FIG. 3 is a flowchart of an exposure control in the camera to which the electronic flash device of the first embodiment is applied.
Figure 4:
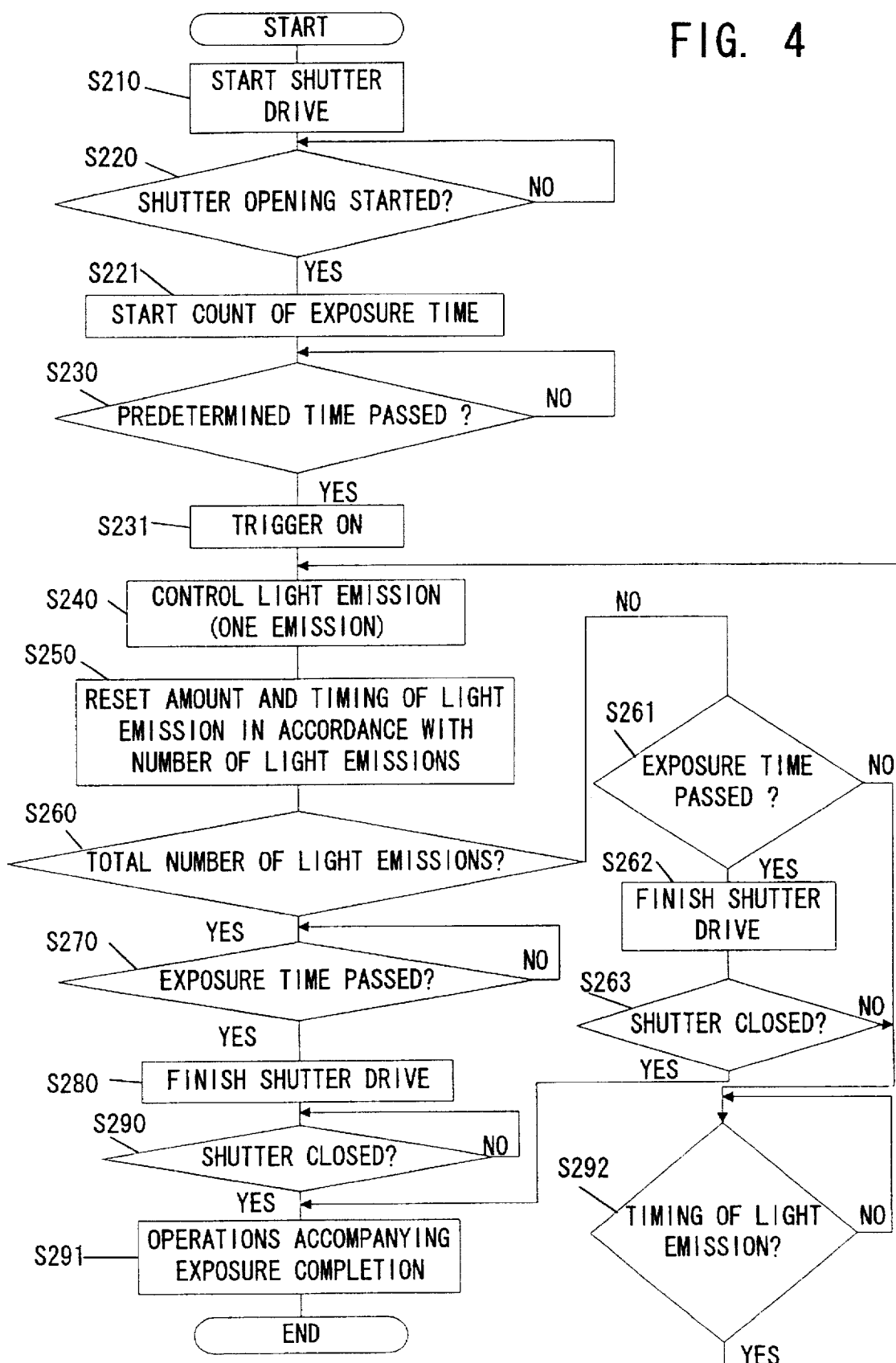
FIG. 4 is a flowchart of exposure control operation in the camera to which the electronic flash device of the first embodiment is applied.

FIGS. 3 and 4 show flowcharts corresponding to the, light emission control operation of the camera system.

FIG. 3 is a flowchart of an exposure control operation in the camera to which the electronic flash device of this embodiment is applied.

Starting from step S100, an exposure control sequence is executed. Step 100 may be executed at a step in a sequence (not shown) of the entire operations of the camera including the operations of various mechanisms, display, and EEPROM communication. In step S110, the CPU 1 instructs the boosting unit 20 of the flash circuit unit 6 to charge the main capacitor C1 until the voltage across the main capacitor C1 reaches a predetermined charge completion voltage.

In step S120, signals representing the states of the respective switches are inputted, and are stored in a random access memory 1a (see FIG. 1) in the CPU 1. In step S130, the data of the first release switch 11 stored in the CPU 1 in step S120 is checked. If the first release switch 11 has been turned on, the process proceeds to step S140. If the first release switch 11 has been turned off, the process returns to step S120 and continues to check the switch.

The steps after S130 are necessary for exposure. Instep S140, the CPU 1 instructs the interface IC 2 to measure the object distance and obtain the distance measurement data. Next, in step S150, the CPU 1 instructs the interface IC 2 to measure the object brightness and obtain the brightness measurement data. Both the distance measurement data and the brightness measurement data are converted to digital data in the interface IC 2 and inputted in the CPU 1.

In step S160, the distance measurement data inputted in the CPU 1 in step S140 is transformed. First, the inputted distance measurement data is transformed to 1/L, which is the inverse of the actual distance. Then, the distance data 1/L is transformed into the amount of lens extension, using a data table in a read only memory (ROM) 1b (see FIG. 1) in the CPU 1. The data table contains the amount of lens extension corresponding to 1/L, and the focal length of the lens is recorded. The data table in the ROM 1b can be stored in an external nonvolatile memory.

In step S170, the brightness measurement data is transformed into exposure time. The transformation is performed by the APEX calculation after the brightness measurement data is logarithmically compressed. Then in step S180, a guide number value of the flash is obtained from the exposure time resulting from step S170, and the amount of flash light and the light emission timing are determined as described below. In repeatedly controlling the light emission, when the shutter aperture is small at the beginning, the effective amount of light is small, and when the shutter aperture is large, the effective amount of light is large. Because the total amount of light relates to the sum of all light emissions, the effective guide number changes in accordance with the length of the exposure time.

Thus, when the distance data resulting from step S160 corresponds to a long distance and the exposure time is short, the amount of light for one emission must be large so that the total guide number will be large. Accordingly, the appropriate amount and timing of light emission determined by the distance and the exposure time are stored in the CPU 1 as a ROM table so that the data corresponding to each photographing condition can be used. The data of the amount and timing of the light emission can be stored in the EEPROM 3 so as to be used for calculation.

In step S190, based on the switch data, the second release switch 12 is checked. The second release switch 12 is operatively coupled with the first release switch 11, and is turned on by a user. In this step S190, if the second release switch 12 has been turned on, the process proceeds to step S191. On the other hand, if the second release switch 12 has been turned off, the process waits for the switch to be turned on.

In step S191, the focus motor 14 (see FIG. 1) is driven in accordance with the instruction of the CPU 1 via the interface IC 2 to drive the focus lens of the camera to a position corresponding to the amount of lens extension determined in step S160. The CPU 1 monitors via the interface IC 2 a driving pulse train outputted from the focus driving sensor 15 (see FIG. 1) in response to the operation of a corresponding mechanism and determines the position of the focus lens.

In step S200, exposure control is executed based on the exposure time determined in step S170. During the process of step S200, the flash circuit unit 6 is also driven to emit light.

Next, referring to FIG. 4, step S200 will be described in detail FIG. 4 is a flowchart of an exposure control operation in the camera to which the electronic flash device of this embodiment is applied.

In step S210, the CPU 1 outputs the shutter driving signal via the interface IC 2 to start the operation of the shutter driving circuit 9 (see FIG. 1). Then in step S220, the CPU 1 checks the monitor signal from the shutter driving circuit 9. When the shutter opens, the monitor signal turns to an "L" level and is transmitted to the CPU 1 via the interface IC 2. While the monitor signal is at an "H" level, the step is looped, and when it turns to the "L" level, the process proceeds to step S221.

In step S221, the count of the exposure time determined in step S170 (see FIG. 3) is started. In step S230, the CPU 1 waits for a predetermined time t1 until the shutter opens to a predetermined aperture value. The predetermined time t1 depends on the mechanical characteristics of the camera and the Light emission characteristics of the flash circuit unit 6. Even if the predetermined time is zero, it is effective.

After the predetermined time has passed, instep S231, the CPU 1 outputs the light emission trigger signal to the flash circuit unit 6. In step S240, the CPU 1 controls the light emission of the flash circuit unit 6. The light emission control involves controlling the turn-on and turn-off times of the IGBT Q1 to make one light emission in accordance with the amount and timing of light emission determined by step S180 (see FIG. 3). The light is emitted in the turn-on period and extinguished in the turn-off period.

In step S250, the CPU 1 resets the amount and timing of light emission in accordance with the number of light emissions of the flash circuit unit 6. This is a process for correcting the reduction of the voltage across the main capacitor C1 due to repeated light emissions. Because the relationship between the number of light emissions and the amount and timing of light emission is previously stored as a data table in the ROM in the CPU 1, the correction is made on the basis of the stored relationship.

In step S260, the CPU 1 checks the number of light emissions. The number of light emissions depends on the voltage across the main capacitor C1 and the amount of light per emission. In this step S260, if the number of repeated light emissions has not reached the total number of light emissions, the step proceeds to step S261, whereas if it has reached the total number of light emissions, the step proceeds to step S270.

In step S261, the count of the exposure time started in step S221 is checked. The count is executed by a hard counter which is not shown. In this step S261, a count completion flag from the hard counter is checked. If the count has been finished, the process proceeds to step S262. If it has not been finished, the process proceeds to step S292 and waits for the timing of light emission which is reset in step S250. When the timing of light emission comes, the process returns to step S240 and continues to control the light emission of the flash circuit unit 6 in accordance with the reset amount of light emission.

The reason why in step S261 the exposure time is checked and the exposure is preferentially completed during the light emission control is that in the case of the exposure control of a camera at a high intensity of ambient light, exposure with ambient light is generally considered appropriate and that it is generally preferable to use flash light as a supplement.

On the other hand, in step S262, the CPU 1 outputs a driving completion signal to the shutter driving circuit 9 via the interface IC 2.

In step S263, the CPU 1 checks the monitor signal from the shutter driving circuit 9 in order to continue to emit light during delay in shutter closing, that is, it takes time for the shutter to be completely closed after the completion of the exposure time is detected in step S261 and the closing operation is started in step S262. Therefore, if the shutter closing is not confirmed on the basis of the monitor signal, the process returns to step S240 via step S292. If the shutter closing is confirmed, the process proceeds to step S291, and the procedure is finished.

If it is determined in step S260 that the total number of light emissions has been completed during the exposure time, the process proceeds to step S270, in which the CPU 1 checks the completion of the exposure time. If the exposure time has passed, the process proceeds to step S280, in which the CPU 1 instructs the shutter driving circuit 9 via the interface IC 2 to finish the shutter drive.

In step S290, the CPU 1 checks whether the shutter has been closed, because it takes time for the shutter to be completely closed after the closing operation is started. If the shutter closing is confirmed in view of the fact that the monitor signal from the shutter driving circuit 9 has turned to the "H" level, the process proceeds to step S291. If the monitor signal remains at the "L" level, step S290 is looped.

In step S291, the CPU 1 executes operations accompanying the completion of exposure, that is, returning the focus lens to its initial position. initializing the interface IC 2, switching the drive power supply to winding up, and other preparatory processes. The CPU 1 also resets the hard timer contained in the CPU 1 and used for counting time (so as to be used in other processes). When step S291 is finished, the whole exposure control is finished, and the process returns to the sequence flow of FIG. 3 again in order to execute other processes (not shown).

FIG. 5 is a timing chart of a light emission control operation and an exposure control operation occuring at a low intensity of light in the electronic flash device of this embodiment.

As shown in the drawing, the shutter driving signal outputted from the CPU 1 to the shutter driving unit 9 via the interface IC 2 has a driving condition at the "H" level. There is a little delay until the shutter is actually driven after the shutter driving signal turns to the "H" level to start the driving. This is the delay time until the shutter aperture detection signal turns to the "L" level. When the predetermined time t1 passes after the shutter aperture detection signal turns to the "L" level to detect the drive of the shutter, the light emission control operation begins to cause light to be repeatedly emitted in accordance with a predetermined set of amounts and timings until the number of light emissions reaches a predetermined number.

After the predetermined exposure time has passed, the CPU 1 turns the shutter driving signal to the "L" level to finish the drive. At this point in time, the shutter starts its closing operation. When its aperture is completely closed, the monitor signal (the shutter aperture detecting signal) turns to the "H" level. By checking the level change, the CPU 1 can confirm that the shutter has been closed.

FIG. 6 is a timing chart of a light emission control operation and an exposure control operation occuring at a high intensity of light in the electronic flash device of this embodiment.

The shutter driving signal outputted from the CPU 1 to the shutter driving unit 9 has a driving condition at the "H" level. As in the case of the low intensity condition, there is a small delay until the shutter is actually driven after the shutter drive is started. This is the delay time until the shutter aperture detection signal turns to the "L" level. When the predetermined time t1 passes after the shutter aperture detection signal turns to the "L" level to detect the drive of the shutter, the light emission control operation begins to cause light to be emitted repeatedly in accordance with a predetermined set of amounts and timings until the number of light emissions has reached a predetermined number.

However, when the predetermined exposure time has elapsed during the light emissions, the CPU 1 turns the shutter driving signal to the "L" level to finish the drive, and the shutter starts its closing operation. Even during the closing operation, the light emission is repeated. When the aperture is completely closed, the monitor signal (the shutter aperture detection signal) turns to the "H" level. By checking the level change, the CPU 1 can confirm that the shutter has been closed. If the number of light emissions up to this time is less than the predetermined number, the light emission control is also finished.

In FIG. 6, the light emission timing shown by broken lines indicates points in time where light should be emitted so that a proper exposure can be made by flashlight. However, light is not emitted in this timing because the shutter has been closed.

As described above, the electronic flash device of this embodiment can vary the amount and timing of light emission for respective light emissions in accordance with the number of the repeated light emissions. However, almost the same effect can be achieved by repeating the light emission in a constant amount and timing, since the aperture of this type of shutter gradually opens so that the decreased amount of light emission can be compensated with the increased size of the aperture.

As described above, the electronic flash device of the first embodiment uses flash emission control, in which the trigger circuit triggers the flash tube DS1 when the predetermined time passes after the release of the shutter is started, and flash light is emitted during the exposure time repeatedly in accordance with a predetermined set of amounts and timings. Thus, even at a high intensity of light or a low temperature where the operation of this type of lens shutter becomes unstable, the flash light can be emitted when the aperture of the shutter is surely open, so that an expected photographic effect by the flash light can be surely obtained.

Next, a second embodiment of this invention is described.

FIG. 7 is a timing chart for a light emission control operation in an electronic flash device of the second embodiment.

The structure of the second embodiment is the same as that of the first embodiment (see FIGS. 1 to 4). However, the content of step S250 of the flowchart of FIG. 4 is different. In step S180 (see FIG. 3) of the first embodiment, the interval between two light emissions is held constant, and the amount of light per emission is variable in accordance with the object brightness. On the other hand, in the second embodiment, the same effect as that of the first embodiment is achieved by varying the timing of light emission.

In the second embodiment, as shown in FIG. 7, when the exposure time is long as shown in FIG. 5, the light emission is controlled such that the turning-off time is long, whereas when the exposure time is short as shown in FIG. 6, the light emission is controlled such that the turning-off time is short. Namely, when the exposure time is sufficiently long, it is preferable to shift the light emissions to the timings when the aperture becomes larger, so that the effective guide number can be large. When the exposure time is short as shown in FIG. 6, light is emitted at short intervals during the exposure time so that the effective guide number can be large. Other structures and effects are the same as those of the first embodiment. Thus their detailed description will be omitted.

According to the electronic flash device of the second embodiment, the same effect as that of the first embodiment an be achieved. In addition, the electronic device can be applied to a broader photographing range.

Next, a third embodiment of this invention is described.

FIG. 8 is a timing chart for explaining a light emission control operation in an electronic flash device of the third embodiment.

The structure of the third embodiment is the same as that of the first embodiment (see FIGS. 1 to 4). However, the content of step S250 of the flowchart of FIG. 4 is different. In step S180 (see FIG. 3) of the first embodiment, the interval between two light emissions is held constant, and the amount of light per emission is variable in accordance with the object brightness. On the other hand, in the third embodiment, the same effect as that of the first embodiment is achieved by varying the interval between the light emissions during the opening to closing operation of the shutter.

As shown in FIG. 8, in this embodiment, the light emission is controlled such that the interval between the light emissions is short immediately after the start of the exposure, and becomes longer as the time passes. That is, when the aperture is small, the number of light emissions is increased to increase the effective guide number. When the aperture becomes large, the interval between the light emissions is widened to adjust the amount of exposure light. Other structures and effects are the same as those of the first embodiment. Thus their detailed description will be omitted.

According to the electronic flash device of the third embodiment, the same effect as that of the first embodiment can be achieved. In addition, the electronic device can be applied to a broader photographing range.

As described above, this invention provides an electronic flash device by which an expected photographing effect can be obtained even in an unstable range of the shutter aperture.

What is claimed is:

1. An electronic flash device for use with a camera having a shutter with an aperture which opens gradually, the electronic flash device comprising:

a flash tube having a discharge path;

a switching element arranged in the discharge path; and a light emission controller for controlling a light emission of the flash tube while an opening diameter of the shutter varies by repeatedly turning on and off the switching element in accordance with an opening operation of the shutter.

2. The electronic flash device according to claim 1, wherein the camera has a light measuring circuit for measuring an object brightness, and wherein the light emission controller varies the turning-on time of the switching element in accordance with the object brightness measured by the light measuring circuit.

3. The electronic flash device according to claim 1, wherein the camera has a light measuring circuit for measuring an object brightness, and wherein the light emission controller varies an amount of turning-on and turning-off operations of the switching element in accordance with the object brightness measured by the light measuring circuit.

4. The electronic flash device according to claim 1, wherein the camera has a light measuring circuit for measuring an object brightness, and wherein the light emission controller varies a timing of the turning-on and turning-off operations of the switching element in accordance with the object brightness measured by the light measuring circuit.

5. The electronic flash device according to claim 1, wherein the camera has an exposure controller for controlling an exposure time of the shutter, and wherein the light emission controller varies a turning-on time of the switching element based on the exposure time.

6. The electronic flash device according to claim 1, wherein the camera has an exposure controller for controlling an exposure time of the shutter, and wherein the light emission controller varies an amount of turning-on and turning-off operations of the switching element based on the exposure time.

7. The electronic flash device according to claim 1, wherein the camera has an exposure controller for controlling an exposure time of the shutter, and wherein the light emission controller varies a timing of the turning-on and turning-off operations of the switching element based on the exposure time.

8. The electronic flash device according to claim 1, wherein the light emission controller stops repeatedly turning-on and turning-off of the switching element when the shutter has been closed.

9. The electronic flash device according to claim 1, wherein the light emission controller controls a turning-on time of the switching element in accordance with an opening amount of the aperture of the shutter.

10. The electronic flash device according to claim 9, wherein the light emission controller decreases the turning-on time of the switching element as the opening amount of the aperture of the shutter increases.

11. The electronic flash device according to claim 1, wherein the light emission controller controls an interval between turning-on operations of the switching element in accordance with an opening amount of the aperture of the shutter.

12. The electronic flash device according to claim 11, wherein the light emission controller lengthens the interval between turning-on operations of the switching element as the opening amount of the aperture of the shutter increases.

13. The electronic flash device according to claim 1, further comprising a memory for storing a table of data relating to at least one of (a) a plurality of amounts of light emission and (b) a plurality of timings of light emission, wherein the light emission controller refers to the table to control at least one of a turning-on time of the switching element, a turning-off time of the switching element, and a timing of turning-on and turning-off of the switching element.

14. The electronic flash device according to claim 1, wherein the light emission controller starts repeatedly turning-on and turning-off of the switching element when a predetermined time passes after the shutter starts to open.

15. An electronic flash control system for use with a camera having a shutter with an aperture which opens gradually, a shutter driving member for driving the shutter, a light measuring circuit for determining an exposure time, and an exposure controller for controlling the shutter driving member in accordance with the exposure time determined by the light measuring circuit, the electronic flash control system comprising:

a boosting circuit including a power source;

a main capacitor connected to the boosting circuit and being charged with a predetermined voltage;

a flash tube connected in series with the main capacitor for emitting a flash light;

a trigger circuit for applying a trigger voltage to the flash tube to emit the flash light;

a semiconductor switch connected in series with the flash tube for controlling the light emission of the flash tube; and a central processing unit for controlling an activation and a deactivation of the semiconductor switch, the boosting circuit, and the trigger circuit, wherein the trigger circuit applies the trigger voltage to the flash tube when a predetermined time passes after the exposure controller starts driving the shutter driving member, and wherein the semiconductor switch is controlled to become conductive and nonconductive so as to repeatedly emit the flash light while an opening diameter of the shutter varies in accordance with a predetermined set of a plurality of amounts and a plurality of timings of the light emission.

16. The electronic flash control system according to claim 15, wherein the plurality of amounts and the plurality of timings of the light emission can be varied in accordance with the number of the repeated light emissions.

17. The electronic flash control system according to claim 15, wherein the plurality of amounts of the light emission can be varied in accordance with the exposure time.

18. The electronic flash control system according to claim 15, wherein the shutter driving member includes a detector for detecting an opening condition of the aperture, wherein the light emission is stopped even during the repeated light emissions when the detector detects that the aperture of the shutter has been closed.

19. The electronic flash control system according to claim 15, wherein the central processing unit comprises an internal memory for storing an effective guide number for the repeated light emissions, the effective guide number being determined by the exposure time.

20. The electronic flash control system according to claim 15, further comprising a nonvolatile memory for storing an effective guide number for the repeated light emissions, the effective guide number being determined by the exposure time.

21. A camera comprising:

a shutter which opens gradually; and a flash device for emitting illumination light to an object to be photographed, wherein the flash device repeatedly emits a small amount of the illumination light while an opening diameter of the shutter varies.

22. The camera according to claim 21, wherein the flash device controls an amount and a timing of the illumination light such that the effective amount of the illumination light reaching a film surface is substantially constant.

* * * * *